(12) United States Patent
Morita

(10) Patent No.: US 8,552,996 B2
(45) Date of Patent: Oct. 8, 2013

(54) MOBILE TERMINAL APPARATUS AND METHOD OF STARTING APPLICATION

(75) Inventor: Hiroshi Morita, Kanagawa (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 274 days.

(21) Appl. No.: 12/707,891

(22) Filed: Feb. 18, 2010

(65) Prior Publication Data

US 2010/0245272 A1    Sep. 30, 2010

(30) Foreign Application Priority Data

Mar. 27, 2009   (JP) ................................. 2009-079974

(51) Int. Cl.
*G06F 3/041*   (2006.01)

(52) U.S. Cl.
USPC ........... 345/173; 345/156; 345/174; 382/181; 382/182; 382/189; 715/780; 715/863; 178/18.03; 178/18.06

(58) Field of Classification Search
USPC .................. 345/173, 156, 174; 382/185–189, 382/181–182; 715/780, 863; 178/18.01–19.07; 455/566
See application file for complete search history.

(56) References Cited

U.S. PATENT DOCUMENTS

| | | | |
|---|---|---|---|
| 5,596,656 A * | 1/1997 | Goldberg | 382/186 |
| 7,030,861 B1 * | 4/2006 | Westerman et al. | 345/173 |
| 7,705,830 B2 * | 4/2010 | Westerman et al. | 345/173 |
| 2004/0188529 A1 * | 9/2004 | Kim | 235/472.01 |
| 2005/0022130 A1 * | 1/2005 | Fabritius | 715/739 |
| 2006/0125803 A1 * | 6/2006 | Westerman et al. | 345/173 |
| 2007/0130547 A1 * | 6/2007 | Boillot | 715/863 |
| 2007/0230789 A1 | 10/2007 | Chang et al. | |
| 2008/0058007 A1 * | 3/2008 | Kang | 455/556.1 |
| 2008/0143975 A1 * | 6/2008 | Dennard et al. | 353/42 |
| 2009/0128374 A1 * | 5/2009 | Reynolds et al. | 341/33 |
| 2010/0083108 A1 * | 4/2010 | Rider et al. | 715/702 |
| 2010/0100854 A1 * | 4/2010 | Russell et al. | 715/863 |

FOREIGN PATENT DOCUMENTS

| | | |
|---|---|---|
| CN | 1533129 A | 9/2004 |
| CN | 101115089 A | 1/2008 |
| EP | 1 462 921 A2 | 9/2004 |
| JP | 7-44311 | 2/1995 |
| JP | 10-154069 | 6/1998 |
| JP | 11-85398 | 3/1999 |
| JP | 2000-137555 | 5/2000 |
| JP | 2002-214028 | 7/2002 |

(Continued)

OTHER PUBLICATIONS

Office Action issued Jun. 21, 2011 in Japanese Patent Application No. 2009-079974.

(Continued)

*Primary Examiner* — Lun-Yi Lao
*Assistant Examiner* — Priyank Shah
(74) *Attorney, Agent, or Firm* — Oblon, Spivak, McClelland, Maier & Neustadt, L.L.P.

(57) ABSTRACT

A mobile terminal apparatus includes a display section, a touch panel section detecting a touch on a display area of the display section, a pattern detection section detecting a pattern input into a specific area of the touch panel section, and a storage section. The storage section stores a relationship between the pattern input into the touch panel section and an application to be started correspondingly to the pattern in an application table. A control section determines an application corresponding to the pattern detected by the pattern detection section on the basis of the application table stored in the storage section and starting the determined application.

5 Claims, 6 Drawing Sheets

(56) References Cited

FOREIGN PATENT DOCUMENTS

| | | |
|---|---|---|
| JP | 2004-252727 | 9/2004 |
| JP | 2007-58612 | 3/2007 |
| WO | WO 2005/003944 A1 | 1/2005 |

OTHER PUBLICATIONS

Office Action issued Jul. 4, 2012 in Chinese Patent Application No. 201010144415.8 (reference previously submitted on Oct. 4, 2012, submitting English-language translation only).

Office Action issued Jul. 4, 2012 in Chinese Patent Application No. 201010144415.8.

Office Action issued Jul. 24, 2012 in Japanese Patent Application No. 2009-079974.

"Dash Board User's Guide", Version 1.5, Five Speed Software, Inc., http://www.fivespeedsoftware.com/dashboard/, Mar. 1, 1999, 27 pages.

Office Action issued May 24, 2013 in Chinese Patent Application No. 201010144415.8.

\* cited by examiner

| No. | PATTERN | APPLICATION TO BE STARTED |
|---|---|---|
| 1 | C | START CAMERA |
| 2 | S | START SCHEDULE |
| 3 | 1 | START TELEPHONE DIRECTORY |
| 4 | 3 | START CALCULATOR |
| 5 | X | TERMINATE ALL THE APPLICATIONS (RETURN TO STANDBY SCREEN) |
| ⋮ | ⋮ | ⋮ |

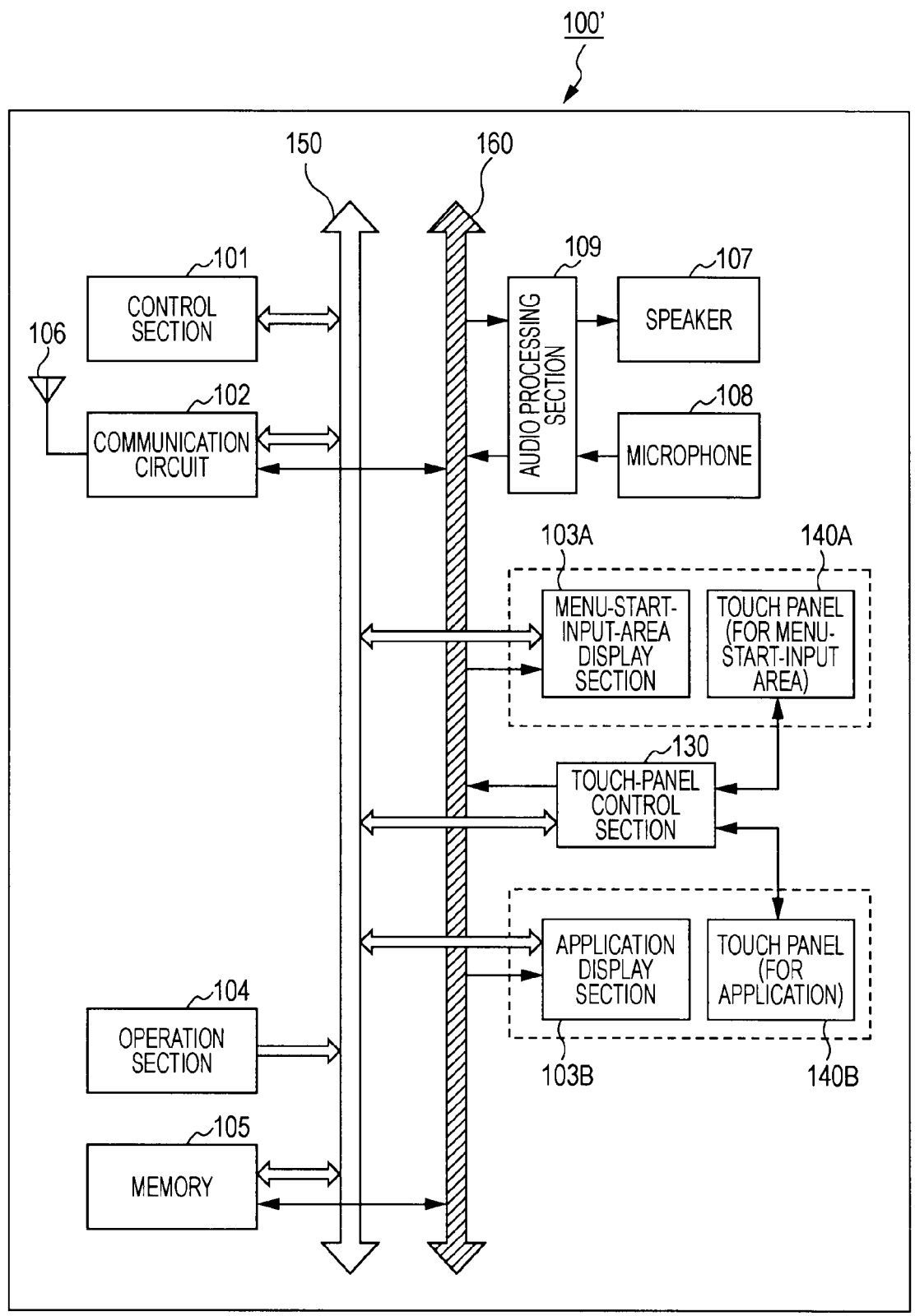

MOBILE TERMINAL APPARATUS AND METHOD OF STARTING APPLICATION

BACKGROUND OF THE INVENTION

1. Field of the Invention

The present invention relates to a mobile terminal suitably applied to a mobile telephone terminal having a touch panel, for example, and an application-start method applied to a mobile terminal.

2. Description of the Related Art

In recent years, various kinds of mobile terminals having a touch panel have been developed. When a user operates a mobile terminal having a touch panel, the user presses the touch panel with a finger or a stylus so that the user can select an icon from one main menu screen, and thus a sub-menu screen is displayed by that selection operation. In that state, the user selects an icon again by a touch operation so that a content screen that the user wants to use is displayed finally.

Japanese Unexamined Patent Application Publication No. 10-154069 includes a description on a mobile terminal in which a user inputs a character corresponding to a specific word related to an application so that the mobile terminal automatically determines the application corresponding to the input character, and suitably starts the application.

SUMMARY OF THE INVENTION

Incidentally, the number of functions and the number of contents held by a mobile terminal are increasing steadily, and thus a screen-transition structure having a tree-structured menu has become complicated. Accordingly, it is necessary for a user to perform many key operations until the user displays a screen for operating a target function or content.

For a method of improving operationality of starting an application using a touch panel, inputting a character which is related to an application is thought to be used as described in Japanese Unexamined Patent Application Publication No. 10-154069, for example. However, inputting a character on a touch panel is not necessarily a simple operation.

Also, in the case of making a selection using a main menu, there has been a problem in that in a state where a user has started a specific application, if the user wants to start another application, operationality for the selection is not user friendly. That is to say, in a method of making a selection from a predetermined main menu, if the user wants to use a different application from an application that the user has started currently, the user has to return to the display of the main menu once again, and then has to proceed to be allowed to select a target application. Accordingly, there has been a problem in that the operation is not user friendly to a user who is not accustomed to such an operation.

The present invention has been made in view of these problems. It is desirable to start many applications easily in a mobile terminal apparatus having a touch panel function.

According to an embodiment of the present invention, there is provided a method of starting an application. In the method, a relationship between a pattern to be input into a specific area of a touch panel and an application to be started when that pattern is input is stored in an application table. And, a determination is made on an application corresponding to the input pattern on the basis of the application table, and the determined application is started.

By this means, for example, a plurality of kinds of patterns to be drawn by a touch operation on a specific area on a touch panel are provided and stored in an application table in advance. And, if a touch operation drawing any one of the stored patterns is performed, an application corresponding to that pattern is started. Thus, a plurality of kinds of applications can be started only by drawing a certain pattern on the touch panel.

By the present invention, if a user inputs a predetermined pattern on a touch panel, the user is allowed to start an application corresponding to the input pattern. Thereby, the user can cut down the number of operations up until displaying an application-start screen in order to perform a target function or content. Accordingly, it becomes possible to improve user friendliness.

BRIEF DESCRIPTION OF THE DRAWINGS

FIG. 7 is an explanatory diagram illustrating an example of a variation of a terminal apparatus according to an embodiment of the present invention.

DESCRIPTION OF THE PREFERRED EMBODIMENTS

Figure 1:
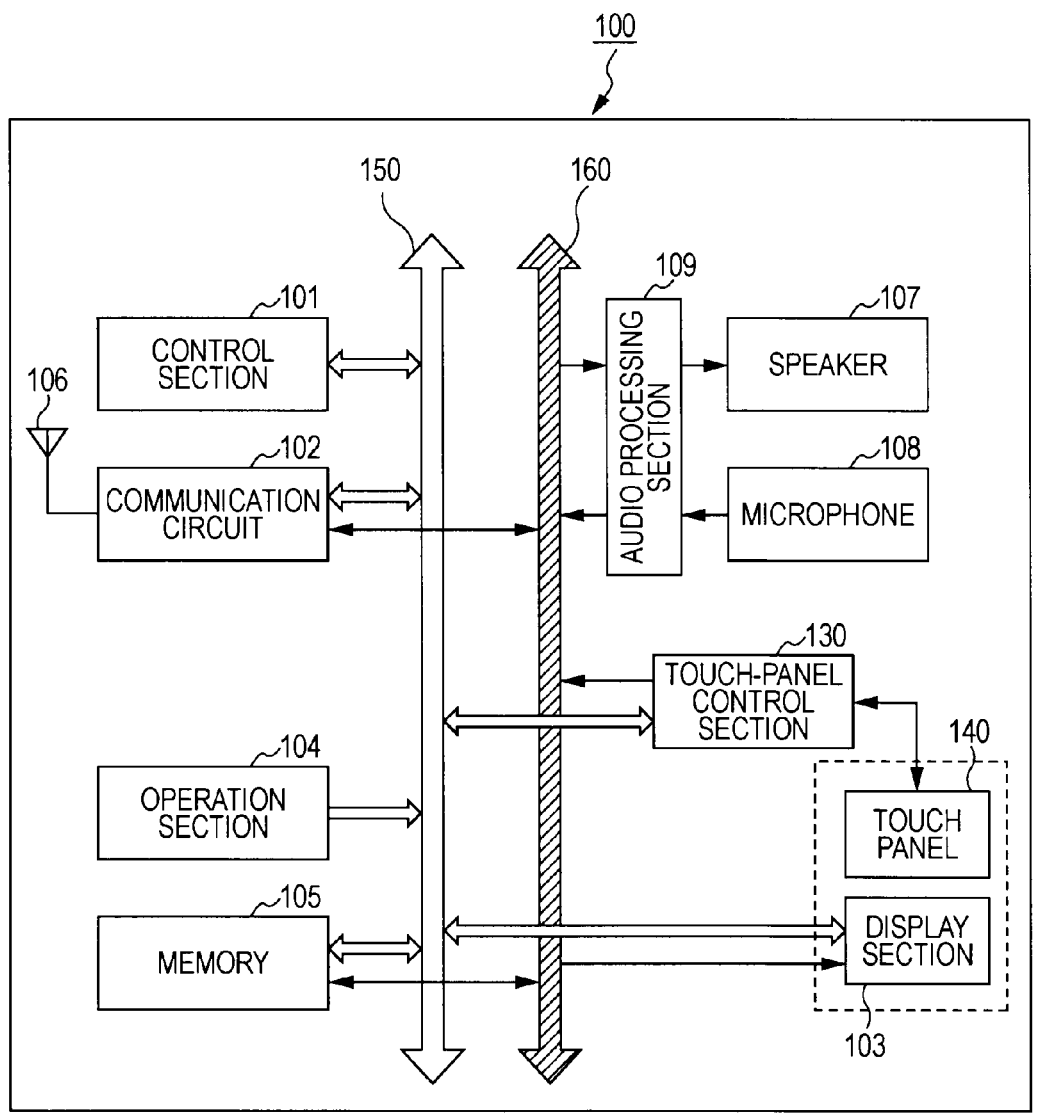
FIG. 1 is a block diagram illustrating an example of an internal configuration of a terminal apparatus according to an embodiment of the present invention.
Figure 2:
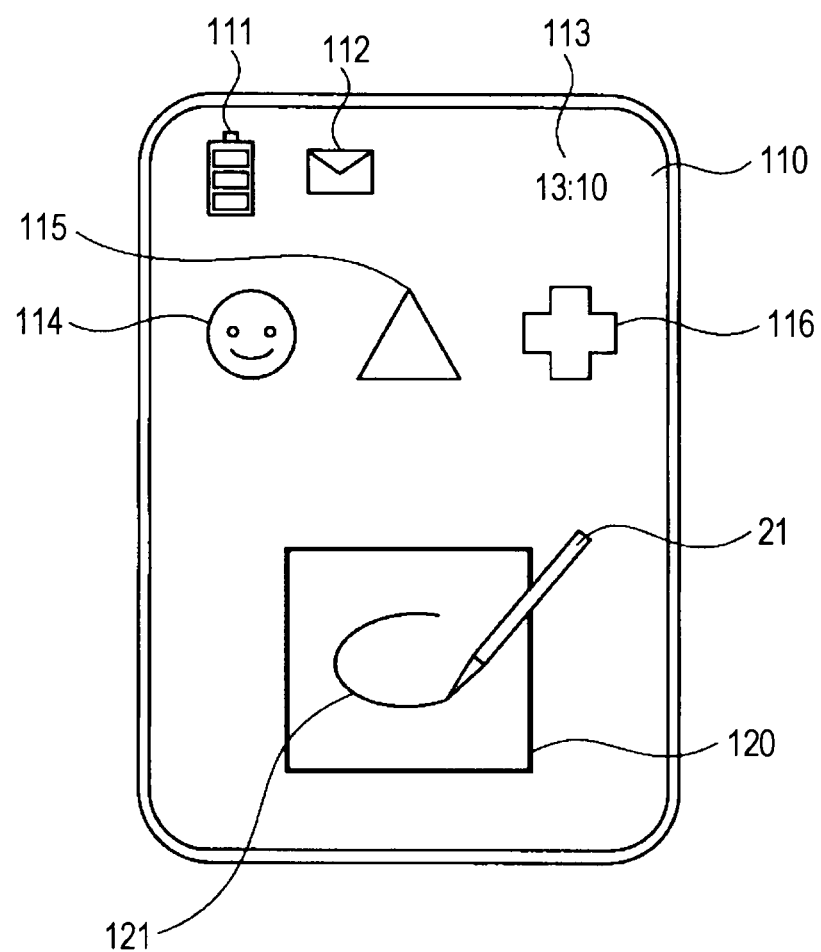
FIG. 2 is an explanatory diagram illustrating an example of a pattern-input screen according to an embodiment of the present invention.
Figure 3:
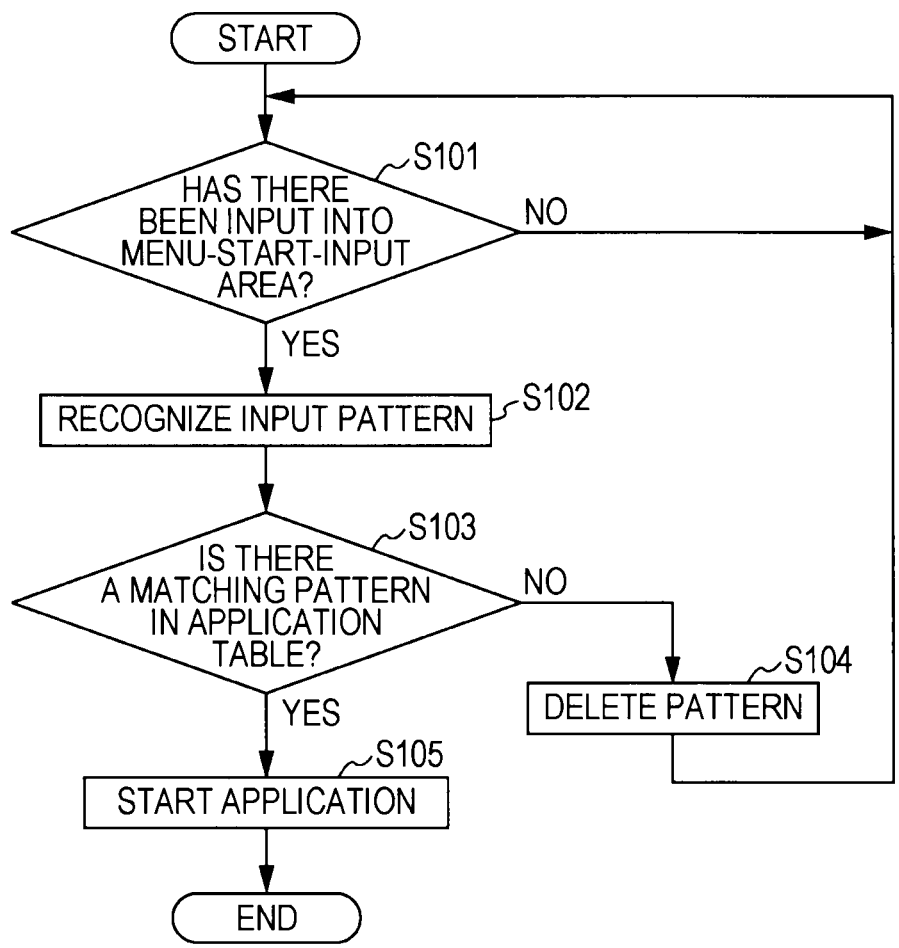
FIG. 3 is a flowchart illustrating an example of processing according to an embodiment of the present invention.
Figures 4, 5:
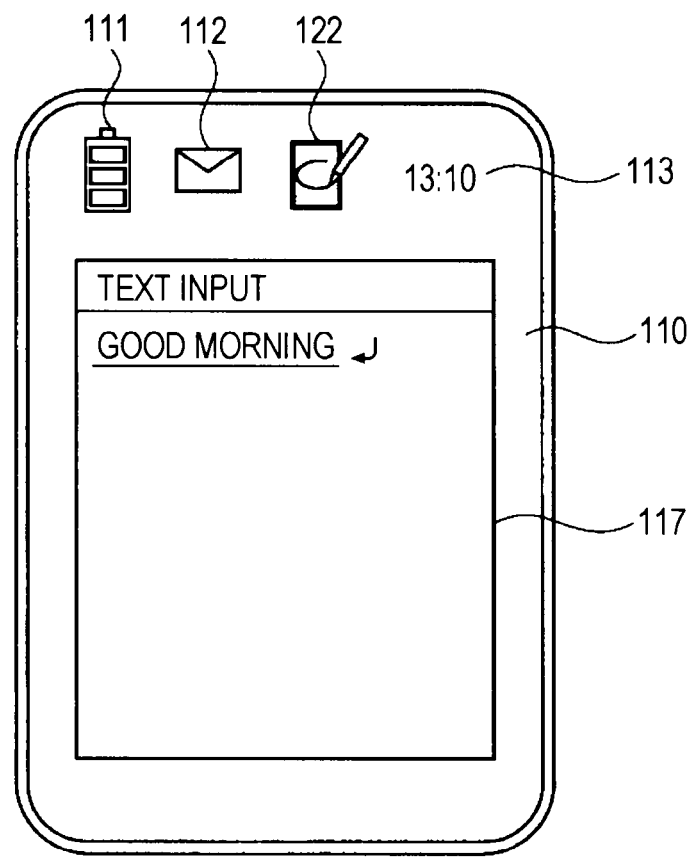
FIG. 4 is an explanatory diagram illustrating an example of an application table according to an embodiment of the present invention.
FIG. 5 is a an explanatory diagram illustrating an example of iconization of a pattern-input screen according to an embodiment of the present invention.
Figure 6:
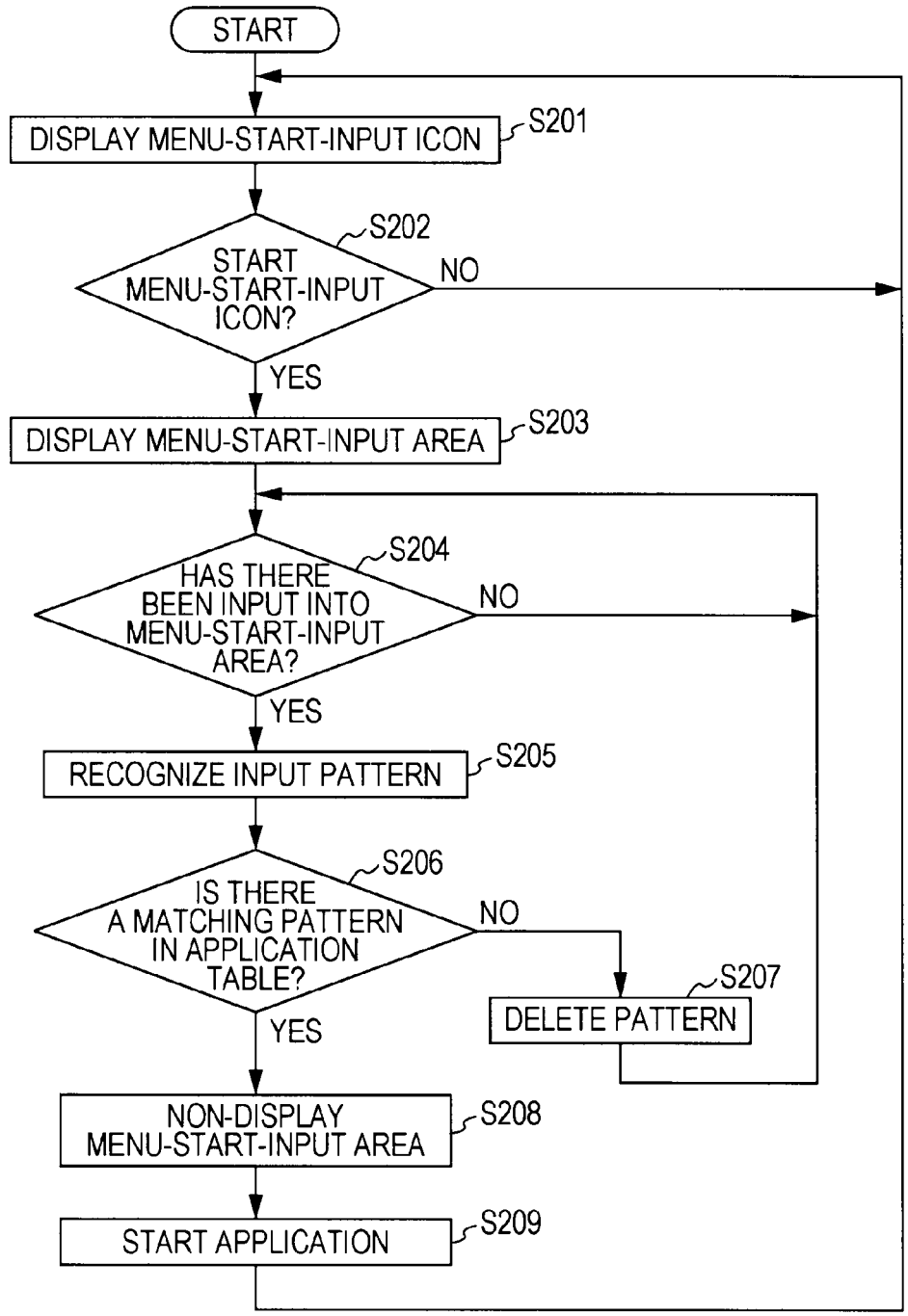
FIG. 6 is a flowchart illustrating an example of processing, from displaying a menu-start-input icon to starting an application, according to an embodiment of the present invention.

In the following, a description will be given of an embodiment of the present invention in the following order.
1. Example of internal configuration of terminal: FIG. 1
2. Example of pattern-input screen: FIG. 2
3. Example of processing of the present embodiment: FIG. 3
4. Example of application table: FIG. 4
5. Example of input-screen iconization: FIG. 5
6. Example from displaying menu-start-input icon to starting application: FIG. 6
7. Explanation of variation of an embodiment: FIG. 7

1. Example of Internal Configuration of Terminal

FIG. 1 is a block diagram illustrating an example of an internal configuration of a mobile telephone terminal 100 according to the present embodiment. The mobile telephone terminal 100 includes a control section 101 including a microprocessor, etc. The control section 101 is connected to each section in the mobile telephone terminal 100 through a control line 150 through which control signals are transmitted or a data line 160 through which data is transmitted. And the control section 101 communicates with each section through these lines, thereby controlling operation of each section.

A communication circuit 102, a display section 103, an operation section 104, a memory 105, and a touch-panel control section 130 are connected to the control line 150.

The communication circuit 102 is a communication section performing radio communication. That is to say, an antenna 106 is connected to the communication circuit 102. The communication circuit 102 demodulates a radio wave obtained by the antenna 106, and extracts an audio signal, various kinds of data, etc., that are transmitted from a base station. Also, the communication circuit 102 supplies the audio signal input through the data line 160 to an audio processing section 109. The signal is subjected to output processing, and is supplied to a speaker 107 for output. Also, the mobile telephone terminal is provided with a microphone 108. The microphone picks up sound surrounding the terminal, and supplies the signal to the audio processing section 109 as an analog audio signal. The audio processing section 109 converts the signal into an audio signal having a predetermined format. The converted audio signal is supplied to the communication circuit 102. Also, various kinds of data to be transmitted in addition to the audio signal is supplied to the communication circuit 102. The communication circuit 102 performs processing for converting the supplied audio signal and the other data in order to output a radio wave from the antenna 106.

The display section 103 includes a display panel including a liquid-crystal panel, etc., and a drive section of the display panel. The display section 103 displays a telephone number of an incoming call, a text message, etc., of an electronic mail transmitted and received through the antenna 106, and an image captured by a camera. In the case of the present embodiment, a touch panel 140 described below is disposed on a display screen of the display section 103. The touch panel 140 is disposed so as to allow a user to perform a touch operation thereon. The operation section 104 includes a dial key, such as digits, etc., and the other various kinds of function keys. And, if the user presses these keys, the operation section 104 generates an operation signal in accordance with an operation content, and supplies the signal to the control section 101.

The memory 105 includes a ROM (Read Only Memory) and a RAM (Random Access Memory). The memory 105 stores software, etc., which is necessary for controlling the mobile telephone terminal 100. The memory 105 also stores programs (software) necessary for controlling a touch-panel control section 130 described below. Moreover, the memory 105 stores data, etc., temporarily generated when the control section 101 performs control. Further, an application table described below is stored in a predetermined area in the memory 105. The application table specifies an application to be started in accordance with a pattern input into the touch panel 140.

The touch panel 140 is connected to the touch-panel control section 130. Detection data generated by the surface of the touch panel 140 having been touched is sent to the touch-panel control section 130, and the touch-panel control section 130 detects which position is touched on which panel, and a pattern input by the touch operation. A specific area in a touch area provided as the touch panel 140 is a menu-start-input area in which a pattern is input by a finger or a stylus 21. When a pattern is input, the touch-panel control section 130 converts the pattern signal into a code for each pattern, and outputs the code to the control section 101. And, the control section 101 checks the application table stored in the memory 105, and selects and starts an application corresponding to the pattern.

In this regard, the touch panel 140 is attached to the surface of the display section 103.

2. Example of Pattern Input Screen

Next, a description is given of a case of starting an application by a touch operation on the display screen of the display section 103. First, a description is given of a display on the display screen of the display section 103 and an example of an operation thereof.

Referring to FIG. 2, a menu-start-input area 120 is displayed on a display screen 110 of the mobile telephone terminal 100. The touch-panel control section 130 detects what touch operation is performed on the menu-start-input area 120. The menu-start-input area 120 is a relatively large area so as to allow the user to input a pattern 121, such as a simple character, etc.

As shown in FIG. 2, the display screen 110 performs various kinds of displays that are necessary as a mobile telephone terminal in addition to a frame indicating the menu-start-input area 120. Specifically, the display screen 110 performs display of a remaining amount of battery 111, incoming-mail display 112, time display 113, etc. Also, various kinds of icons 114, 115, and 116 are displayed. When each of the icons 114 to 116 is touched, each of the functions corresponding to the icon is started.

3. Example of Processing of the Present Embodiment

Next, with reference to a flowchart in FIG. 3, a description is given of an example of processing of the case where a pattern is input in the menu-start-input area 120 on the display screen 110 of the mobile telephone terminal 100, and a corresponding application is started.

The processing of the flowchart in FIG. 3 is performed when the user is displaying the menu-start-input area 120 on the display screen 23 of the mobile telephone terminal 100.

A description will be given with reference to FIG. 3. First, a determination is made on whether the user has input a pattern in the menu-start-input area 120 (step S101).

If there is no input, the current state is kept as it is. On the other hand, if there has been an input, the input pattern is recognized (step S102).

Next, a determination is made on whether the recognized pattern matches a pattern in the application table (step S103).

If there is no matched pattern, the recognized pattern is deleted (step S104), the processing returns to step S101, and input of a new pattern is waited.

On the other hand, if there is a matched pattern, the application corresponding to the matched pattern in the application table is started (step S105).

4. Example of Application Table

Here, a description will be given of the application table stored in the above-described memory 105 with reference to an example in FIG. 4. The application table is a list of applications to be started for each pattern drawn in the menu-start-input area 120. For example, patterns are assumed to be set in the application table such that a pattern "C" is starting a camera, a pattern "S" is starting a schedule, a pattern "1" is starting a telephone directory, a pattern "3" is starting a calculator, and a pattern "X" is terminating all the applications.

And, if a pattern described in the application table is detected to have been input in the menu-start-input area 120, the application corresponding to the pattern is started. If "C" is input, the camera is started. If "S" is input, the schedule is started. If "1" is input, the telephone directory is started. If "3" is input, the calculator is started. If "X" is input, all the started applications are terminated.

In this regard, the application table may be preset in advance. However, the user may freely set or add a pattern in the table. Also a relationship between a pattern (character) and an application may be freely set.

Also, a pattern to be set in the application table is determined to be a single pattern. Thereby, the user can easily memorize a pattern independently of the user's ability.

5. Example of Iconization of Input Screen

In the example in FIG. 2, a relatively large area is used as the menu-start-input area 120. However, the menu-start-input area 120 sometimes fails to be displayed because a screen of any other application has been already displayed on the screen. In such a case, it is thought that an icon for displaying the menu-start-input area 120 is displayed, for example.

FIG. 5 illustrates an example of the case where an icon for displaying the menu-start-input area is displayed. The icon (called a menu-start-input icon 122) is displayed. The menu-start-input icon 122 is displayed in a relatively small size at the upper part of the screen 110 in alignment with the display of the remaining amount of battery 111, the incoming-mail display 112, the time display 113, etc., for example. In this manner, it is possible to ensure an area for displaying an application execution screen 117 (in this example, a mail-text-input screen).

In a display state shown in FIG. 5, if the user clicks the menu-start-input icon 122 with a finger or the stylus 21, the screen is changed to the display state shown in FIG. 2, showing the menu-start-input area 120. The operation after that is the same as the processing described with the flowchart in FIG. 3. However, before an application is started, the menu-start-input area 120 becomes non-displayed. The menu-start-input icon 122 is displayed again in the area that does not hinder display of the application.

6. Example of Processing from Display of Menu-Start-Input Icon to Starting Application Next, a description will be given of an example of the processing from the display of the menu-start-input icon 122 to starting an application with reference to a flowchart in FIG. 6. Note that the processing of the flowchart in FIG. 6 is executed when the user is displaying the menu-start-input icon 122 on the display screen of the mobile telephone terminal 100.

First, the display of the menu-start-input icon 122 is checked on the display screen 110 of the mobile telephone terminal 100 (step S201). And, a determination is made of whether the menu-start-input icon 122 is started or not (step S202). In this regard, starting is carried out by clicking the icon with a finger or a stylus 21.

If not started, the current state is remained without change. On the other hand, if started, the menu-start-input area 120 is displayed (step S203).

After that, the processing described from step S101 to step S103 in FIG. 3 is applied to the processing from the input of the menu-start-input area 120 to the pattern matching.

And, if there is no matched pattern, the recognized pattern is deleted (step S207), the processing returns to step S204, and input of a new pattern is waited.

On the other hand, if there is a matched pattern, first, the menu-start-input area 120 is non-displayed (step S208). After that, an application corresponding to the matched pattern in the application table is started (step S209).

Next, after the application has been started, the menu-start-input icon 122 is displayed again in the area that does not hinder the display of the application.

In this regard, the menu-start-input icon 122 can be called even if an application is started.

Also, in place of the menu-start-input icon 122 on the touch panel, the menu-start-input area 120 may be displayed by disposition of a dedicated key switch on the operation section 104 or a predetermined key operation. If the menu-start-input area 120 is displayed by that key operation, when the key is operated again, the menu-start-input area 120 may be non-displayed. Alternatively, the menu-start-input area 120 may be displayed at the time of operating a specifically assigned key switch in a state of displaying the menu-start-input icon 122.

In this manner, in the present embodiment, it is possible to easily start an application without performing operations up until displaying a screen for operating a target function or content. Also, the user himself/herself can freely set the application table in which an input pattern and an application to be started correspondingly to that pattern is set, and thus the user can store a pattern which is easy to remember.

7. Explanation of a Variation of an Embodiment

In the above-described embodiment, a mobile telephone terminal having only one display section with a touch panel is used. On the other hand, a mobile telephone terminal may have two display sections with a touch panel. That is to say, one of the display sections may be used exclusively for a menu-start-input area, and the other of the display sections may be used exclusively for displaying the application corresponding to the pattern input in the menu-start-input area.

A description will be given of an example of an internal configuration of the variation with reference to FIG. 7. The internal configuration of a mobile telephone terminal 100' of this variation includes the mobile telephone terminal 100 having the configuration shown in FIG. 1, one additional touch panel, and one additional display section. Thus, the explanation of the configuration excluding the touch panel and the display section is omitted.

First, a display section having a display panel including a liquid-crystal panel, etc., and a drive section of the display panel is provided with a menu-start-input area display section 103A and an application display section 103B. And, in these display sections, a telephone number of an incoming call, a text of an electronic mail, etc., transmitted and received through an antenna 106, and a captured image by a camera are displayed.

Next, the touch-panel control section 130 is connected to a touch panel 140A for a menu-start-input area and to a touch panel 140B for an application. The touch panel 140A for a menu-start-input area and the touch panel 140B for an application are attached on the surface of the individual display sections, the menu-start-input area display section 103A and the application display section 103B, respectively.

And, the touch panel 140A for a menu-start-input area is exclusively provided with a menu-start-input area for inputting a pattern with a finger or a stylus 21. If a pattern is input, the signal of the pattern is converted into a position signal by the touch-panel control section 130, and is output to the control section 101. And, the control section 101 refers to an application table stored in the memory 105, selects the corresponding application, and starts the application display section 103B.

An explanation of the example of the processing in this variation up to the application start is the same as the processing of the flowchart in FIG. 3. However, in step S101, input is carried out in the touch panel 140A for a menu-start-input area, and in step S105, an application is started in the application display section 103B.

With such a variation, it is possible to use the menu-start-input area 120 all the time, and thus it becomes possible to control by the sequence in FIG. 3 all the time. Thereby, it is possible to omit time and effort for calling the area in order to use the menu-start-input area 120 every time. Accordingly, it becomes possible to improve user-friendliness.

In this regard, in the above-described embodiment, a description has bee given of an example in which the present invention is applied to a terminal apparatus, which is a mobile telephone apparatus. However, the present invention ought to be applied to the other various kinds of mobile terminals having a touch panel as a matter of course.

The present application contains subject matter related to that disclosed in Japanese Priority Patent Application JP 2009-079974 filed in the Japan Patent Office on Mar. 27, 2009, the entire content of which is hereby incorporated by reference.

It should be understood by those skilled in the art that various modifications, combinations, sub-combinations and variations may occur depending on design requirements and other factors insofar as they are within the scope of the appended claims or the equivalents thereof.

What is claimed is:

1. A mobile terminal apparatus comprising:
   a display section;
   a touch panel section detecting a touch on a display area of the display section;
   a pattern detection section detecting a pattern input into a specific area of the touch panel section;
   a storage section storing a relationship between the pattern input into the touch panel section and an application to be started correspondingly to the pattern in an application table; and
   a control section determining an application corresponding to the pattern detected by the pattern detection section on the basis of the application table stored in the storage section and starting the determined application, wherein the control section, when the application corresponding to the pattern detected by the pattern detection section is started, removes the specific area from display, and reinserts the specific area to be displayed in response to an actuation of a key displayed on the display section even if the application is running, said control section terminating all previously invoked applications in response to a predetermined pattern detected by the pattern detection section.

2. The mobile terminal apparatus according to claim 1, wherein the application table allows setting a pattern corresponding to each application to any single pattern.

3. The mobile terminal apparatus according to claim 1, wherein the display section displays an icon for performing pattern detection by the pattern detection section, and
   if an operation specifying the icon is performed on the touch panel section, the specific area for detecting a pattern by the pattern detection section is displayed on the display section.

4. The mobile terminal apparatus according to claim 3, further comprising, if the icon is being displayed on the display section, an operation section having a key switch allowing appearance of the specific area on the display section in order for the pattern detection section to perform pattern detection.

5. A method of starting an application, the method comprising the steps of:
   detecting a pattern input into a specific area of a touch panel;
   storing a relationship between the pattern input into the touch panel and an application to be started correspondingly to the pattern in an application table; and
   determining an application corresponding to the pattern detected by the touch panel on the basis of the application table and starting the determined application, wherein
   the control section, when the application corresponding to the pattern detected by the pattern detection section is started, removes the specific area from display, and reinserts the specific area to be displayed in response to an actuation of a key displayed on the display section even if the application is running, said control section terminating all previously invoked applications in response to a predetermined pattern detected by the pattern detection section.

* * * * *